United States Patent
Reisinger et al.

(10) Patent No.: US 12,249,827 B2
(45) Date of Patent: Mar. 11, 2025

(54) CONVERTER ASSEMBLY AND METHOD FOR OPERATING A CONVERTER ASSEMBLY

(71) Applicant: AVL List GmbH, Graz (AT)

(72) Inventors: Erwin Reisinger, Feldkirchen bei Graz (AT); Martin Schmidt, Langen (DE)

(73) Assignee: AVL List GmbH, Graz (AT)

( * ) Notice: Subject to any disclaimer, the term of this patent is extended or adjusted under 35 U.S.C. 154(b) by 186 days.

(21) Appl. No.: 17/908,923

(22) PCT Filed: Mar. 5, 2021

(86) PCT No.: PCT/AT2021/060077
§ 371 (c)(1),
(2) Date: Sep. 2, 2022

(87) PCT Pub. No.: WO2021/174278
PCT Pub. Date: Sep. 10, 2021

(65) Prior Publication Data
US 2023/0103971 A1    Apr. 6, 2023

(30) Foreign Application Priority Data
Mar. 5, 2020 (AT) .............. A 50180/2020

(51) Int. Cl.
*H02J 1/10* (2006.01)
*H02J 1/14* (2006.01)
(Continued)

(52) U.S. Cl.
CPC .............. *H02J 1/102* (2013.01); *H02J 1/106* (2020.01); *H02J 1/14* (2013.01); *H02J 3/38* (2013.01); *H02J 7/34* (2013.01)

(58) Field of Classification Search
CPC .... H02J 1/102; H02J 1/106; H02J 1/14; H02J 3/14; H02J 3/28; H02J 3/32; H02J 3/322; H02J 3/46; H02J 3/38; H02J 7/34
See application file for complete search history.

(56) References Cited

U.S. PATENT DOCUMENTS 11,418,106 B2    8/2022    Tian
11,664,777 B2    5/2023    Spesser et al.
(Continued)

FOREIGN PATENT DOCUMENTS

DE    29800567    4/1998
DE    10225409    12/2003
(Continued)

OTHER PUBLICATIONS

English translation of the International Preliminary Report on Patentability (Chapter I) in PCT/AT2021/060077, originally the Written Opinion of the International Searching Authority, mailed on Jun. 7, 2021. Obtained from Global Dossier on Apr. 30, 2024. (Year: 2021).*

(Continued)

*Primary Examiner* — Fred E Finch, III (57) ABSTRACT

The invention relates to a converter assembly comprising at least two converters (7, 7') and a control unit (1) connected to the converters (7, 7'), wherein the control unit (1) is designed, continuously or at discrete time intervals, to transmit to the converters (7, 7') their permissible electrical power range, in particular their minimum power value $P_{min}$ and/or their maximum power value $P_{max}$, to determine the current power balance of the individual converters (7, 7') or to receive it from same, and to adjust the permissible electrical power range of the converters (7, 7') in such a way that the power balance of the entire converter assembly does (Continued)

not leave a predefined range. The invention also relates to a method for operating a converter assembly of this type.

17 Claims, 4 Drawing Sheets

(51) Int. Cl.
*H02J 3/38* (2006.01)
*H02J 7/34* (2006.01)

(56) References Cited

U.S. PATENT DOCUMENTS

| | | | | |
|---|---|---|---|---|
| 2009/0218175 | A1* | 9/2009 | Wesson | B66B 1/302 187/289 |
| 2010/0065351 | A1* | 3/2010 | Ichikawa | B60L 58/15 903/930 |
| 2010/0114395 | A1* | 5/2010 | Hinatsu | C25B 15/02 700/295 |
| 2011/0089760 | A1* | 4/2011 | Castelaz | B60L 55/00 307/25 |
| 2013/0009603 | A1* | 1/2013 | Okui | H02J 9/00 320/167 |
| 2013/0301327 | A1 | 11/2013 | Wagoner et al. | |
| 2017/0358929 | A1* | 12/2017 | Koeppe | H02J 1/08 |
| 2020/0235579 | A1* | 7/2020 | Soeffker | B60L 5/00 |
| 2023/0106145 | A1 | 4/2023 | Reisinger et al. | |

FOREIGN PATENT DOCUMENTS

| | | |
|---|---|---|
| DE | 102008026870 | 12/2009 |
| EP | 2544332 | 1/2013 |
| EP | 1931586 | 6/2013 |
| EP | 2665170 | 11/2013 |

OTHER PUBLICATIONS

Notice of Allowance Dated Jul. 5, 2023 from the US Patent and Trademark Office Re. U.S. Appl. No. 17/909,046. (10 pages).
International Search Report and the Written Opinion Dated Apr. 17, 2021 From the International Searching Authority Re. Application No. PCT/AT2021/060077 and Its Translation of Search Report Into English. (10 Pages).
Internationaler Recherchenbericht und Schriftlicher Bescheid [International Search Report and the Written Opinion] Dated Jun. 4, 2021 From the International Searching Authority Re. Application No. PCT/AT2021/060079 and Its Translation of Search Report Into English. (11 Pages).

\* cited by examiner

CONVERTER ASSEMBLY AND METHOD FOR OPERATING A CONVERTER ASSEMBLY

RELATED APPLICATIONS

This application is a National Phase of PCT Patent Application No. PCT/AT2021/060077 having International filing date of Mar. 5, 2021, which claims the benefit of priority of Austrian Patent Application No. A50180/2020 filed on Mar. 5, 2020. The contents of the above applications are all incorporated by reference as if fully set forth herein in their entirety.

FIELD AND BACKGROUND OF THE INVENTION

The invention relates to a converter assembly and a method for operating a converter assembly.

Converter assemblies with multiple converters are known for a variety of applications in the field of electrical engineering. In particular, to provide the drive power and to control the electric machine, drives of electric vehicles and hybrid vehicles have converter assemblies with several converters to convert the DC voltage provided by a battery into suitable AC voltages or DC voltages for the electrical machine to be driven and other consumers within the vehicle.

Electrically operated test stands also often include converter assemblies with several converters, whether for testing the powertrains of electric vehicles, hybrid vehicles, conventional vehicles with internal combustion engines, mechanical components such as the transmission, or the battery storage systems themselves. In particular, the testing of battery storage systems is often carried out in parallel, whereby several battery cells, battery modules or battery packs are tested simultaneously with converters arranged in parallel.

Electronic control units for such converter assemblies are known from the prior art. These are usually designed to activate the individual converters in a particular sequence based on a required target value, whereby this can also include the simultaneous activation of all converters. For example, in an electric vehicle, a maximum acceleration (kickdown) or emergency braking can be required which results in the simultaneous activation of several converters of the vehicle. Also in a test stand for a powertrain with several electrical machines or for a multicellular battery module, the specified test methodology (the so-called test run) can require the simultaneous activation of several converters of the converter assembly.

The problem thereby arises that the energy supply of such converter assemblies is usually limited, whether in the form of the battery installed in an electric vehicle, or in the form of the central network usually provided in a test stand in the form of an alternating current network or a DC voltage intermediate circuit. In particular, it should be possible to create DC voltage intermediate circuits on site using components which are as compact as possible (so-called line rectifiers), which in turn limits the maximum energy flow during the performance of test runs. The simultaneous activation of several converters can also lead to an overloading of the central network, both in the form of excessive power consumption from the power supply (for example during a kickdown) and also in the case of excessive power output in the power supply (for example in the event of emergency braking).

SUMMARY OF THE INVENTION

The object of the invention consists, among other things, in creating a converter assembly and a method for controlling a converter assembly which avoids an overloading of the energy supply and allows as far as possible a homogeneous load distribution of the converters in order to burden the energy supply from the central network as little as possible, or ideally not at all.

According to the invention, these and other objects are achieved with a converter assembly and a method for controlling a converter assembly according to one of the independent claims.

A converter assembly according to the invention comprises at least two converters and a control unit connected to the converters. The control unit may be designed as an electronic data processing unit, in particular as a computer, microcontroller, microprocessor or the like and may include an electronic data processing unit and an electronic storage unit.

According to the invention, the control unit is designed to receive, continuously or at discrete time intervals, measurement data from the converters, in particular current and voltage measured values or power data, and to transmit control data to the converters. For this purpose, the control unit can be connected via an interface unit to a data bus which is designed for bidirectional communication with the converters, for example a USB interface or the like.

The control unit is also designed to transmit to the converters of the converter assembly their permitted electrical power range. This can be a power range which can be formed in particular by a minimum power value $P_{min}$ and/or a maximum power value $P_{max}$. During operation, the control unit thus receives measurement data from the converters or other electrical components and supplies a permissible power range to each converter of the converter assembly. The invention is not limited to positive power flows (power consumption, operation as a motor), but also includes negative power flows (power output, operation as a generator).

Furthermore, the control unit can also be designed to transmit current power setpoints to the converters. For example, these can involve the states of a test stand desired in a test run, or the requirements of the driver of a vehicle during operation. The control unit thereby ensures that the power setpoints lie within the permissible power range for the respective converter.

According to the invention, the control unit is designed to determine the current power balance of the converters or to receive this from the converters via the data bus. The term current power balance refers to the current power consumption or power output of the converters. It should be noted that converters according to the invention can allow bidirectional operation, i.e. they can both consume power and output power. In particular, the converters can be so-called active front-end converters. In this context, an active front-end converter is a bidirectional converter which can transmit electrical energy in both directions, for example an actively switched bridge rectifier or bridge inverter.

The control unit is also designed to calculate the power balance of the entire converter assembly from the received power balances of the individual converters. This is usually the sum of the power balances of the individual converters. Alternatively, the control unit may also be connected to higher-level voltage and current sensors which allow the calculation of the power balance of the entire converter assembly.

The control unit is also designed to adjust the permissible electrical power range of the converters in such a way that the power balance of the entire converter assembly does not leave a predetermined range. The power ranges of converters operated as motors and generators can cancel each other out, so that the entire converter assembly is operated within a narrow power range, even though the individual converters in each case consume or output a high power.

To determine the current power balance of the converters, the control unit can be connected to at least one voltage sensor to measure the input voltage of the converters and to current sensors to measure the input currents of the converters.

In particular, the converters may be supplied by a DC voltage intermediate circuit and the control unit may be connected to a voltage sensor for measuring the voltage in the DC voltage intermediate circuit. This allows the control unit to calculate the current power consumption or power output of each converter in a simple manner. However, in order to determine the current power balance of the converters, the control unit can also be connected to voltage sensors to measure the output voltage of the converters and to current sensors to measure the output currents of the converters. In this way, the power balances of the converters are determined on the output side. These can be AC voltage sensors or AC current sensors.

However, the converters can also be connected to internal or external voltage sensors to measure their output voltage and to internal or external current sensors to measure their output currents, and can be designed to transmit the measured values to the control unit. In these cases, the converters themselves supply their current power balance or their current and voltage values to the control unit.

The control unit can be designed to adjust the permissible electrical power range of the converters if the input voltage of the converters, in particular the voltage in a DC voltage intermediate circuit supplying the converters, falls below a predetermined threshold value or exceeds a predetermined threshold value. The control unit then ensures that the DC voltage of the DC voltage intermediate circuit remains within a predetermined range. If the DC voltage exceeds this range, then the permissible power range of individual or all converters is reduced; if the DC voltage falls below the range, then the permissible power consumption of individual or all converters is reduced. This prevents an excessive loading of the DC voltage intermediate circuit. If this requires the adjustment of power values defined in test runs, a change in the test runs is still more advantageous than an unforeseen termination of the test run due to overloading of the intermediate circuit.

Furthermore, a discharge device connected to the control unit can be provided to reduce the voltage in a DC voltage intermediate circuit, and the control unit can be designed to activate the discharge device if the voltage in the DC voltage intermediate circuit exceeds a predetermined threshold value. The discharge device can for example be a heating resistor that is designed to reduce the voltage in the DC voltage intermediate circuit. As a result, a reduction of the voltage in the DC voltage intermediate circuit can be achieved in a particularly fast way, for example in the event of emergency braking of a vehicle, or if all batteries are discharged simultaneously in a battery test stand.

The device according to the invention thus ensures that the DC voltage intermediate circuit is loaded as little as possible. In particular, a "back-to-back" arrangement of the converters may be provided, wherein a power output of a first converter is used directly to supply a second converter, so that energy only needs to be provided to overcome losses. In particular, the control unit may be designed to modify a predetermined test run in such a way that the power balance of the converter assembly does not leave a specified range at any time during a test run.

The converters can be designed as active front-end converters with bidirectional power flow. The converters can in particular be used as machine converters in a drive test stand is or as DC-DC converters in a battery test stand.

Further converter assemblies according to the invention can be used in hierarchical network structures for network balancing. According to the invention, at least two of the converters can be formed as line converters, in particular AC-DC converters, which supply separate sub-networks, preferably in the form of separate DC voltage intermediate circuits, from a central network. The control unit can thereby be designed to adjust the permissible electrical power range of the converters in such a way that the power balance of the central network does not leave a predetermined range. In this case, the control unit thus controls the power distribution from the central network to the individual sub-networks in such a way that the power balance of the central network remains as far as possible within a particular power range.

According to the invention, in such network structures at least two further converters may be arranged in at least one of the sub-networks, wherein the control unit is designed also to adjust the permissible electrical power range of these converters in such a way that the power balance of each sub-network does not leave a predetermined range. This allows hierarchical network balancing; on the one hand at the level of the sub-networks, on the other hand at the level of the central network.

The invention further relates to a test stand, preferably for a plurality of devices under test, for example for the components of a drive or for electrical energy storage means such as batteries, including a converter assembly according to the invention. In particular, a DC voltage intermediate circuit can be provided for power supply, and all converters can be connected to the control unit via a bidirectional data bus.

The invention also relates to a method for operating a converter assembly with at least two converters and a control unit connected to the converters, comprising the following steps: in a first step, transmitting, via the control unit, a permissible electrical power range to the converters, in particular a minimum power value $P_{min}$ and/or a maximum power value $P_{max}$. In a further step, receiving or calculating, via the control unit, the current power balance of the individual converters. In a further step, calculating, via the control unit, the power balance of the entire converter assembly. In a further step, adapting, via the control unit, the permissible electrical power range of the converters in such a way that the power balance of the entire converter assembly does not leave a predetermined range.

The control unit also continuously supplies the converters with setpoints for their electrical power. This can be a scheduled supply, for example as part of a test run, or an unscheduled supply, for example in response to a request by a driver of a vehicle. To calculate the current power balance of the converters, the control unit can receive the input voltage of the converters from at least one voltage sensor and the input currents of the converters from current sensors. The control unit can receive the voltage of a DC voltage intermediate circuit from a voltage sensor.

The control unit can receive the output voltages of the converters from voltage sensors and the output currents of the converters from current sensors. The control unit can adjust the permissible electrical power range of the converters if the input voltage of the converters, in particular the voltage of a DC voltage intermediate circuit supplying the converters, falls below a predetermined threshold value or exceeds a predetermined threshold value.

The control unit can activate a discharge device connected to the control unit to reduce the voltage in a DC voltage intermediate circuit if the voltage in the DC voltage intermediate circuit exceeds a specified threshold value.

The control unit can also adjust the permissible electrical power range of the converters of a central network in such a way that the power balance of the converters of the central network does not leave a predetermined range, and adjust the permissible electrical power range of the converters of at least one sub-network in such a way that the power balance of the converters of each sub-network does not leave a predetermined range.

The invention further extends to a computer-readable storage medium comprising computer-readable instructions that cause an electronic control unit, for example a computer, a microcontroller or a microprocessor, to carry out a method according to the invention.

BRIEF DESCRIPTION OF THE SEVERAL VIEWS OF THE DRAWINGS

Further features according to the invention arise from the claims, the figures and the following description of the figures. The invention is explained below on the basis of non-exclusive exemplary embodiments.

DESCRIPTION OF SPECIFIC EMBODIMENTS OF THE INVENTION

Figure 1:
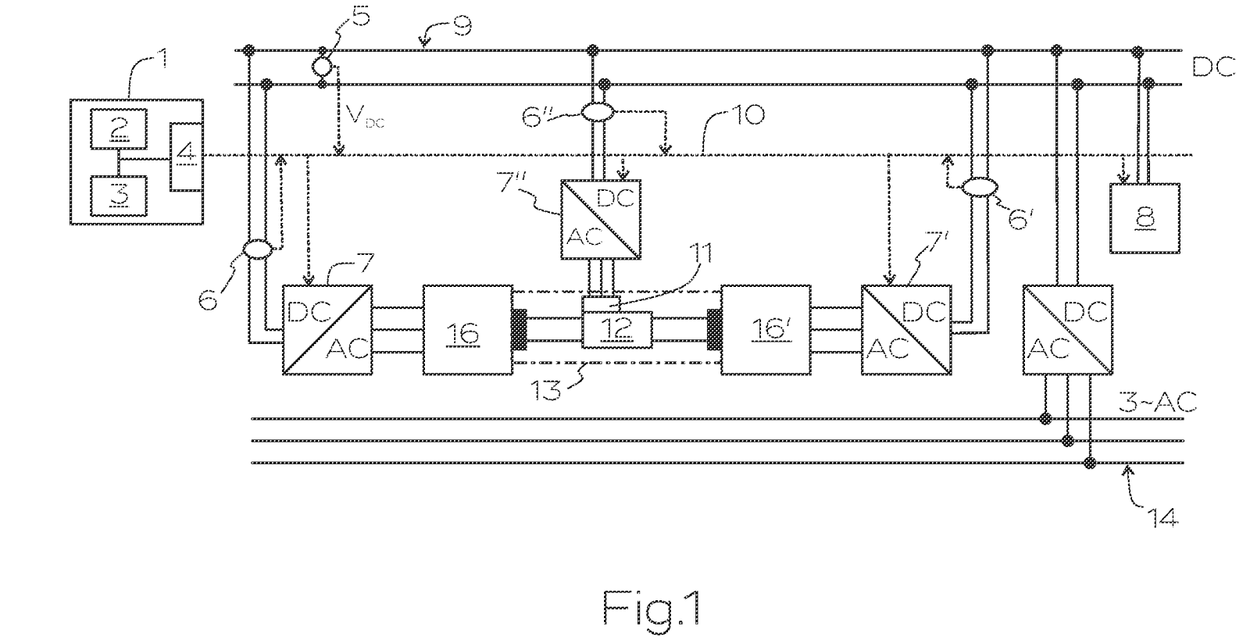
FIG. 1 shows a schematic block diagram of the topology of a converter assembly according to the invention in a test stand for drives.

FIG. 1 shows a schematic block diagram of the topology of an exemplary embodiment of a converter assembly according to the invention in a test stand for drives. The test stand includes a line converter that converts a central network 14 (multiphase AC line voltage) available at the test stand into a DC voltage of around 820 V. This DC voltage is referred to as intermediate circuit voltage (DC link) and is available at the test stand to supply the device under test. The line converter is a DC voltage converter (AC-DC converter) in the form of a switched active front-end bridge rectifier.

In this exemplary embodiment, the test stand is designed for testing the electrical and mechanical components of a drive device under test 13 with a drive unit 11, for example an electric motor, and a transmission 12. The drive which is to be tested may be the drive of a motor vehicle, in particular an electric vehicle or a hybrid vehicle. In this exemplary embodiment, two electrical machines 16, 16' (load machines, so-called dynamometers) are provided which are coupled to the shaft of the drive device under test 13. These electrical machines 16, 16' are supplied by two converters 7, 7' (machine converters) which convert the intermediate circuit DC voltage $V_{DC}$ into an AC voltage. The converters 7, 7' are designed as AC voltage converters (DC-AC converters), for example as switched active front-end bridge inverters.

In addition to the mechanical drive train of the drive 13, the electric drive unit 11 of the drive device under test 13 is also tested in this exemplary embodiment.

For this purpose, the test stand includes a further bidirectional converter 7" which is connected to the intermediate circuit 9 and provides the drive unit 11 with a variable AC voltage. Depending on the operating state, the drive unit 11 consumes power or supplies power to the intermediate circuit.

Current sensors 6, 6', 6" are arranged in the DC voltage input lines of the converter 7, 7', 7", and a voltage sensor 5 is arranged in the DC voltage intermediate circuit 9. These sensors continuously supply measured values of the voltage in the intermediate circuit 9 and the input currents of the converters 7, 7', 7" to a control unit 1 via a data bus 10. In this exemplary embodiment, the converter assembly includes the three converters 7, 7', 7", but not the line converter.

The control unit 1 is connected to the converters 7, 7', 7" and to a discharging device 8, likewise via the data bus 10. These connections are used to specify for the converters a permissible power range and, optionally, a power setpoint $P_{soll}$, or to activate the discharge device 8 to reduce the voltage in the intermediate circuit 9.

In this exemplary embodiment, the control unit 1 is designed as an electronic microcontroller with a central data processing unit (CPU) 2, for example an ARM microprocessor or an ASIC. The data processing unit 2 is connected to a storage unit 3 and an interface unit 4 via a data bus. The storage unit 3 can be any machine-readable data memory, for example a non-volatile semiconductor memory or volatile semiconductor memory, ROM, EPROM, EEPROM, RAM, SRAM, flash memory and the like.

The interface unit 4 can be based on industry standards such as USB, FireWire, Ethernet, USART, I2S and the like. Wireless network protocols can also be provided, such as Wi-Fi, Bluetooth and the like. Embodiments of suitable control units are part of the general expertise of the skilled person, so that not every component of the control unit 1 needs to be explained in detail.

During operation, the control unit 1 continuously measures the voltage in the intermediate circuit 9 and the currents of the converters 7, 7', 7", and provides the converters 7, 7', 7" in each case with power setpoints and their permissible power ranges. If the DC voltage measured by the DC voltage sensor 5 falls below a predetermined threshold value, or if this DC voltage exceeds a predetermined threshold value, then the control unit 1 adapts the permissible power range in such a way that the voltage drop or voltage rise is counteracted.

This ensures that the voltage in the intermediate circuit 9 always remains within a certain bandwidth, so that the line converter is only moderately loaded.

Ideally, the control unit 1 adapts the power flows of the converters 7, 7', 7" in such a way that the line converter is only required to the cover the power loss. This can be achieved if at least one of the converters 7, 7', 7" supplies power to the intermediate circuit 9, and at least one of the converters 7, 7', 7" draws power from the intermediate circuit 9. The control unit 1 may be designed to actively induce such "back-to-back" operating states, even if this involves modifying predefined test models. This makes it possible to achieve a particularly compact dimensioning of the line converter.

Figure 2:
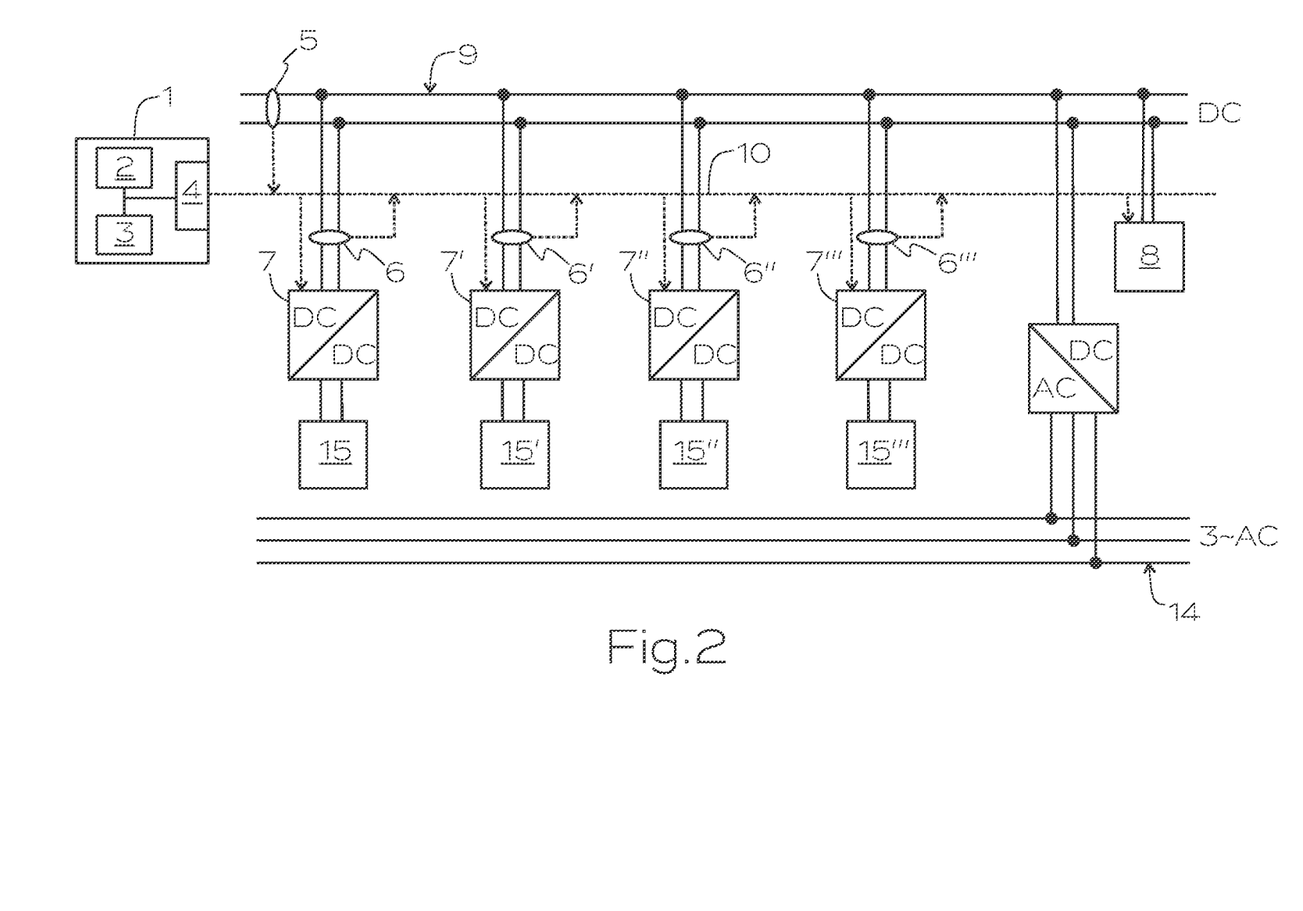
FIG. 2 shows a schematic block diagram of the topology of a converter assembly according to the invention in a test stand for batteries (so-called battery cycler)

FIG. 2 shows a schematic block diagram of the topology of another exemplary embodiment of a test stand for batteries according to the invention (so-called battery cycler). In this exemplary embodiment, four active front-end converters 7, 7', 7", 7'" controlled by the control unit 1 are provided which are each designed as switched DC/DC converters and which charge or discharge a battery 15, 15', 15", 15'". In this exemplary embodiment, the converter assembly includes the four converters 7, 7', 7", 7'", but not the line converter which generates the intermediate circuit voltage.

The functionality of the control unit 1 is similar to the exemplary embodiment according to FIG. 1. The control unit 1 adapts the permissible power ranges of the converters 7, 7', 7", 7'" in such a way that the sum of the powers of the converters lies below a predetermined threshold value.

In the event that the voltage in the intermediate circuit 9 exceeds a predetermined threshold value, the control unit 1 activates a discharge unit 8, for example a heating resistor, in order to relieve the intermediate circuit. In the event that the voltage in the intermediate circuit 9 falls below a different threshold value, the control unit 1 reduces the power ranges of individual or all converters, so that the voltage in the intermediate circuit 9 recovers again.

Instead of the individual batteries 15, 15', 15", 15'", in exemplary embodiments which are not shown, separate battery cells or battery modules (combinations of battery cells) can also be tested.

Figure 3A:
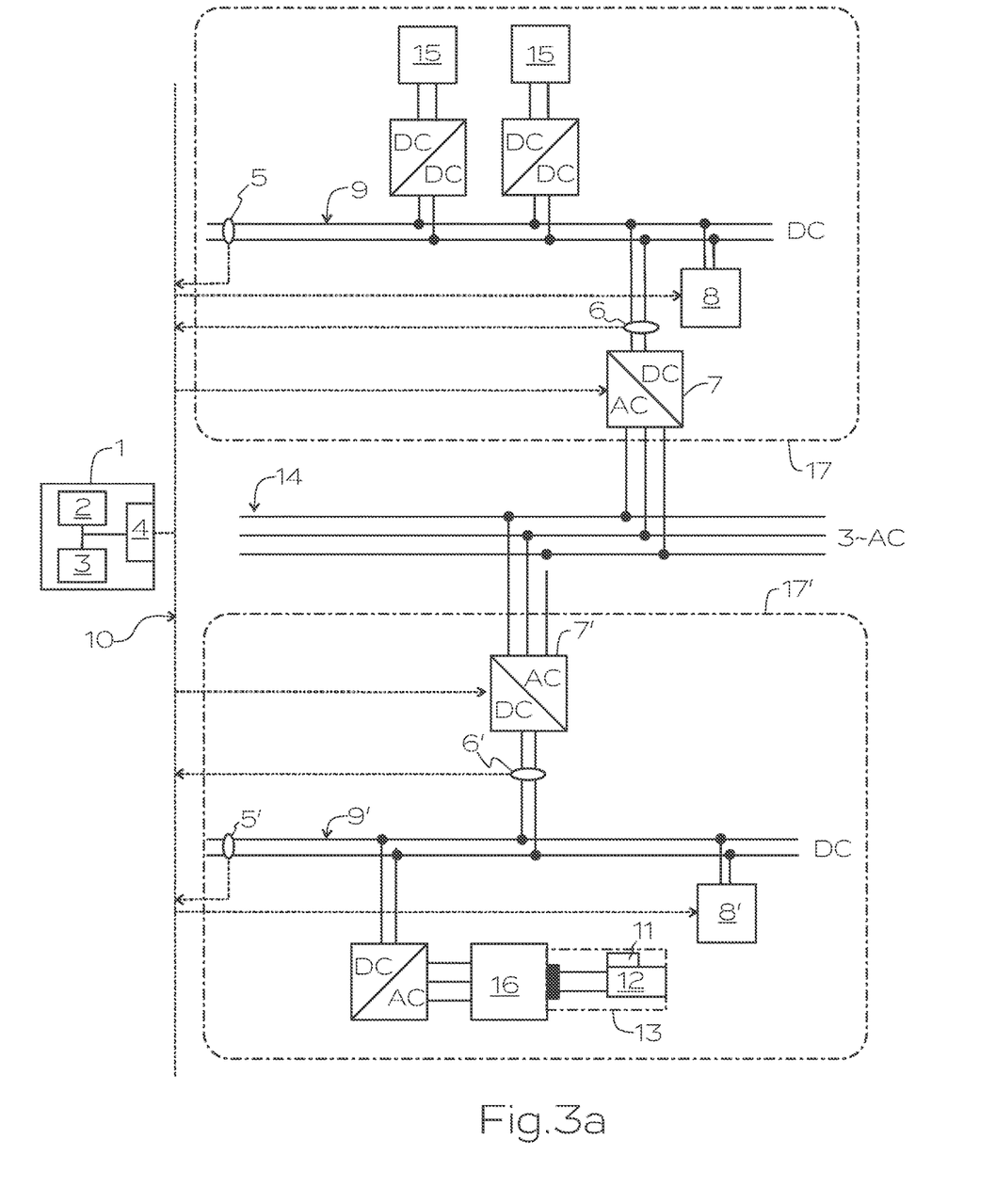
FIGS. 3a-3b show schematic block diagrams of the topologies of converter assemblies according to the invention in a hierarchical network structure with two sub-networks.
Figure 3B:
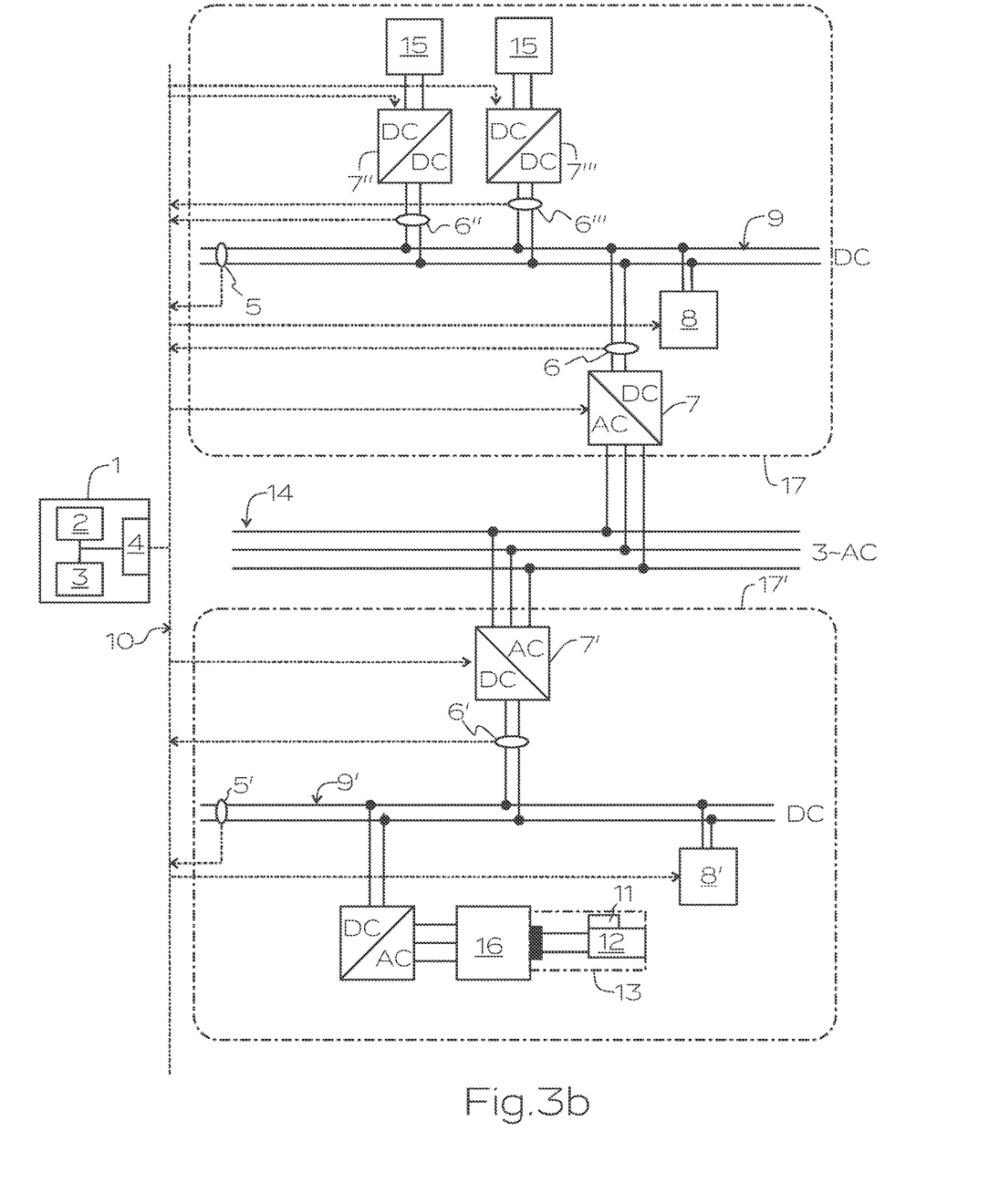

FIGS. 3a-3b show schematic block diagrams of the topologies of converter assemblies according to the invention in a hierarchical network structure with two sub-networks. In FIG. 3a, two sub-networks 17, 17' are provided which are supplied by a central network 14 (3-phase AC network) via converters 7, 7'. In this exemplary embodiment, the converters 7,7' are line converters, i.e. rectifiers which each supply a DC voltage intermediate circuit 9, 9'. Voltage sensors 5, 5' are arranged in the DC voltage intermediate circuits 9, 9' which supply their measured values to a control unit 1 via the data bus 10. Furthermore, current sensors 6, 6' are arranged in the DC lines of the converters 7, 7' which also supply their measured values to a control unit 1 via the data bus 10. The DC voltage intermediate circuits 9, 9' supply two converters for testing batteries 15 in the first sub-network 17, and in the second sub-network 17' supply a converter for operating an electrical machine 16 for testing a drive device under test 13. However, these converters are not connected to the control unit 1.

The control unit 1 ensures a measured balance between the two sub-networks 17, 17' by continuously transmitting permissible power ranges to the converters 7, 7' via the data bus 10. If necessary, the control unit 1 can also activate one of the two discharge devices 8, 8' to reduce the voltage in the intermediate circuits 9, 9'. However, an active influencing of the powers of the converters in the sub-networks does not take place in this exemplary embodiment.

FIG. 3b shows a direct further development of the exemplary embodiment according to FIG. 3a. In this exemplary embodiment, the two converter 7", 7'" of the sub-network 17, which test the batteries 15, are also connected to the control unit 1 via the data bus 10. Thus, the control unit 1 can not only balance the power of the sub-networks 17, 17' with respect to the central network 14 but also, within the sub-network 17, supply the two converters 7", 7'" with permissible power ranges in such a way that the power balance in the sub-network 17 remains within a predetermined range. Such a design is particularly advantageous in practice, since it allows the operation of various test systems on a common central network 14.

In other exemplary embodiments, not shown, not the control unit, but each converter itself is connected to internal or external voltage sensors to measure their output voltage and to internal or external current sensors to measure their output currents. The converter transmits these measured values for current and voltage to the control unit, or calculates its current power balance itself and transmits this to the control unit. Naturally, exemplary embodiments are also envisaged in which some of the controlled converters determine their power balance themselves, and others do not determine their power balance themselves; instead, the control unit is responsible for determining the power balance of these converters. In this respect, the invention is not limited to the exemplary embodiments described above.

However, the invention is not limited to the present exemplary embodiments, but includes all converter assemblies and methods for operating converter assemblies within the framework of the following claims.

Terms used herein such as converter, line converter or machine converter should not be interpreted too narrowly. A converter according to the invention, be it a machine converter or a line converter, can be understood as any controlled electrical and/or electronic circuit that converts one DC voltage into another DC voltage or AC voltage, or converts an AC voltage into another AC voltage or DC voltage. Such a circuit may for example, but not exclusively, be a direct converter, a matrix converter, an AC voltage converter, a DC voltage converter, a switched bridge inverter, a switched bridge rectifier or the like. The concrete realisation of the converter in terms of circuitry is not critical. Converters provided according to the invention can also feature internal galvanic isolation and can be intended for high electrical powers, for example powers in the region of 100 kW at a DC voltage of 850 V or 300 kVA alternating current power.

LIST OF REFERENCE SIGNS 1 control unit
2 data processing unit
3 storage unit
4 interface unit
5, 5' voltage sensor
6, 6', 6", 6'" current sensor
7, 7', 7", 77'" converter
8, 8' discharge device
9, 9' DC voltage intermediate circuit
10 data bus
11 drive unit
12 transmission
13 drive device under test
14 central network
15, 15', 15", 15'" battery
16, 16' electrical machine
17, 17' sub-network

The invention claimed is:

1. Converter assembly comprising at least two converters and a control unit connected to the at least two converters,
wherein the control unit is designed, continuously or at discrete time intervals,
to transmit electrical power to the at least two converters, wherein the electrical power is within an electrical power range, of a minimum power value Pmin and a maximum power value Pmax, to determine the current electrical power balance of each of the at least two converters or to receive the electrical power balance from same, and to calculate the electrical power balance of the converter assembly, to adjust the electrical power range of each of the at least two converters, wherein the at least two converters are supplied by an intermediate circuit with voltage, VDC, the electrical power range adjusted if VDC falls below a predetermined value or exceeds a predetermined value, and to adjust the electrical power range of the at least two converters in such a way that the power balance of the converter assembly is within a predetermined range.

2. Converter assembly according to claim 1, wherein, in order to determine the current power balance of the at least two converters, the control unit is connected to at least one voltage sensor to measure the input voltage of each of the at least two converters and to current sensors to measure the input currents of each of the at least two converters.

3. Converter assembly according to claim 1, wherein the control unit is connected to a voltage sensor to measure the VDC.

4. Converter assembly according to claim 1, wherein, to determine the current power balance of the at least two converters, the control unit is connected to voltage sensors to measure the output voltage of the at least two converters and to current sensors to measure the output currents of the at least two converters.

5. Converter assembly according to claim 1, wherein the at least two converters are connected to voltage sensors to measure their output voltage and to current sensors to measure their output currents, and transmit the measured values to the control unit.

6. Converter assembly according to claim 1, wherein a discharge device connected to the control unit is provided to reduce the voltage in the DC voltage intermediate circuit, wherein the control unit activates the discharge device if the VDC exceeds a predetermined value.

7. Converter assembly according to claim 1, wherein the at least two converters are active front-end converters with bidirectional power flow.

8. Converter assembly according to claim 1, wherein the active front-end converters are machine converters in a drive test stand or DC-DC converters in a battery test stand.

9. Converter assembly according to claim 1, having at least four converters, wherein at least two of the converters are designed as line AC-DC converters, each of the line AC-DC converters supply separate sub-networks as separate DC voltage intermediate circuits, from a central network, wherein the control unit adjusts the electrical power range of the line converters in such a way that the power balance of the at least two line converters of the central network is within a predetermined range.

10. Converter assembly according to claim 9, wherein at least two line converters are arranged in at least one of the separate sub-networks, wherein the control unit adjusts the electrical power range of the the at least two line converters in such a way that the power balance of the line converters of each sub-network is within a predetermined range.

11. Method for operating a converter assembly with at least two converters and a control unit connected to each of the at least two converters, comprising the following steps:
 a. transmitting, via the control unit (1), electrical power to each of the at least two converters, in a range with a minimum power value Pmin and a maximum power value Pmax,
 b. receiving or calculating, via the control unit, the current power balance of the each of the at least two converters,
 c. calculating, via the control unit, the power balance of the converter assembly,
 d. adapting, via the control unit, the electrical power range of the at least two converters if the voltage VDC of a DC voltage intermediate circuit supplying each of the at least two converters falls below a predetermined value or exceeds a predetermined value, and
 e. adapting, via the control unit, the electrical power range of the at least two converters in such a way that the power balance of the converter assembly is within a predetermined range.

12. Method according to claim 11, wherein, in order to calculate the current power balance of the at least two converters, the control unit receives the input voltage of the at least two converters from at least one voltage sensor and the input currents of the at least two converters from current sensors.

13. Method according to claim 11, wherein the control unit receives the VDC from a voltage sensor.

14. Method according to claim 11, wherein the control unit receives the output voltages of the at least of two converters from voltage sensors and the output currents of the at least two converters from current sensors.

15. Method according to claim 11, wherein the at least two converters are connected to voltage sensors to measure output voltages and to current sensors to measure output currents, and transmits the measured values to the control unit.

16. Method according to claim 11, wherein the control unit activates a discharge device connected to the control unit to reduce the VDC if the VDC exceeds a predetermined value.

17. Method according to claim 11, wherein the control unit,
 adjusts the electrical power range of the at least two converters of a central network in such a way that the power balance of the at least two converters of the central network is within a predetermined range, and
 adjusts the electrical power range of the at least two converters of at least one sub-network in such a way that the power balance of the at least two converters of each sub-network is within a predetermined range.

* * * * *